United States Patent [19]

Böhmer

[11] Patent Number: 5,229,921
[45] Date of Patent: Jul. 20, 1993

[54] PORTABLE DATA PROCESSING DEVICE WITH TURNABLE DISPLAY HAVING TWO VERTICAL POSITIONS

[75] Inventor: Christian Böhmer, Nürnberg, Fed. Rep. of Germany

[73] Assignee: TA Triumph-Adler Aktiengesellschaft, Nürnberg, Fed. Rep. of Germany

[21] Appl. No.: 858,695

[22] Filed: Mar. 27, 1992

[30] Foreign Application Priority Data

Apr. 23, 1991 [DE] Fed. Rep. of Germany ....... 4113171

[51] Int. Cl.$^5$ ..................... H05K 7/16; E05D 11/10; G05G 11/00; G06F 1/16
[52] U.S. Cl. ..................... 361/393; 361/380; 16/324; 74/483 K; 400/680
[58] Field of Search .............. 16/324, 325, 326, 371; 74/483 K; 403/95, 104, 96, 107, 99, 108; 248/284; 400/664, 680, 682, 83; 361/380, 392, 393, 394, 395, 399; 364/708

[56] References Cited

U.S. PATENT DOCUMENTS

| | | | |
|---|---|---|---|
| 4,739,316 | 4/1988 | Yamaguchi et al. | 400/680 X |
| 4,808,017 | 2/1989 | Sherman et al. | 400/83 |
| 4,859,092 | 8/1989 | Makita | 400/83 |
| 5,125,610 | 6/1992 | Queau | 248/284 |

Primary Examiner—Leo P. Picard
Assistant Examiner—Michael W. Phillips
Attorney, Agent, or Firm—Michael J. Striker

[57] ABSTRACT

A portable data processing device has a housing, a display, turnable holding arms arranged to hold the display above an upper side of the housing. Each of the holding arms has a holding arm-extension part provided with a blocking slider. The housing and the holding arm have locking recesses. The blocking slider has a first blocking portion which in one end position engaging in the locking recess of the holding arm and a second locking portion which in another end position engages in the locking recess of the housing. The blocking slider is spring biased in direction toward the locking opening of the holding arm and fixed in a locking position which is opposite to a spring force. The device also has a turning arm which locks the blocking slider in the locking position. The display is turnable and vertically movable between two different positions.

10 Claims, 1 Drawing Sheet

PORTABLE DATA PROCESSING DEVICE WITH TURNABLE DISPLAY HAVING TWO VERTICAL POSITIONS

BACKGROUND OF THE INVENTION

The present invention relates to a portable data processing device in form of a so-called laptop.

More particularly, it relates to a portable data processing device which has a housing with a keyboard, and a display arranged above the housing on the upper side of the housing on turnable holding arms. A blocking slider is provided on each holding arm and engages in a first locking portion in a locking recess of the holding arm. It also engages with a second locking portion in a second end bearing in a locking recess of the housing.

Portable data processing devices of the above mentioned general type are known in the art. Due to the above described arrangement the display can be turned upwardly about different turning axes. One axis is located further in front of the user and the turning up of the display is thereby performed directly from the upper side of the housing. The other turning axis lies further behind as seen from the user and enables the turning up of the display through holding arm-extension parts so that the lower edge of the display is located above the upper side of the housing and thereby allows the observation of the user, for example of a printer located behind the laptop.

SUMMARY OF THE INVENTION

Accordingly, it is an object of the present invention to provide a portable data processing device which is a further improvement of the above described existing device.

More particularly, it is an object of the present invention to provide a portable data processing device in which with a simple and convenient handling and always definite turning axes, there is no danger that the linkage mechanism can be damaged by one-sided loads.

In keeping with these objects and with others which will become apparent hereinafter, one feature of the present invention resides, briefly stated, in a portable data processing device in form of a so-called laptop, in which the blocking slider is spring-loaded in direction to the arresting recess of the holding arm and is fixable by means of a turning lever in a locking position opposite to the spring force.

Correspondingly, the holding arm extension parts are arrested in the locking position, while to the contrary in the unfolded condition the holding arm-extension parts are pressed automatically into the arresting recess by the spring of the blocking slider. Therefore in this configuration a stable connection is ensured.

The turning lever can be formed as a cam disc, and an arresting connection can be arrestable on the cam disc behind a corresponding arresting projection on the blocking slider. Naturally, instead of such an arresting, a sufficient arresting can be achieved by a clamping in the same way.

In accordance with an advantageous embodiment, a helical spring abuts with pressure loading against a transverse wall on the one hand, and against the rear side of the blocking slider on the other hand. The helical spring can engage in a U-shaped recess of the blocking slider and abut against the bottom of the recess.

For providing a locking which prevents an unauthorized turning up of the holding arm-extension part it is advantageous when a hook projection is arranged on the lower side of the blocking slider and extends through a recess in the upper side of the housing so as to engage behind the blocking slider in the arrested condition.

For actuating the turning lever it extends in a lateral recess of the holding arm-extension parts so that a comfortable handling is possible without the danger of damage to an important part.

In order to prevent asymmetrical loading of the hinges and their possible damage, a guiding rod is arranged on the housing that is transversely displaceable. In a turned condition of the holding arm-extension part, pins of the turning lever cam disc pass through it in the corresponding recesses. The pins are arranged so that they are offset on the two-sided cam discs eccentrically to the turning axis of the cam disc and perpendicular to the axial longitudinal direction of the guiding rod.

Thereby a three point-configuration is provided and the remains rigid when the two-sided turning lever is actuated non-uniformly. Correspondingly a tearing of the rod is prevented.

In accordance with a further advantageous feature of the present invention, the guiding rod is guided by guides transversely and parallel to the lower edge of the display and has an offset between the guided portions, in correspondence with the offset of the pins and the cam discs.

For obtaining an additional fixation in the end positions, the guiding rod is also provided with arresting recesses which receive a springy arresting projection so that the guiding rod is arrestable in both end positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
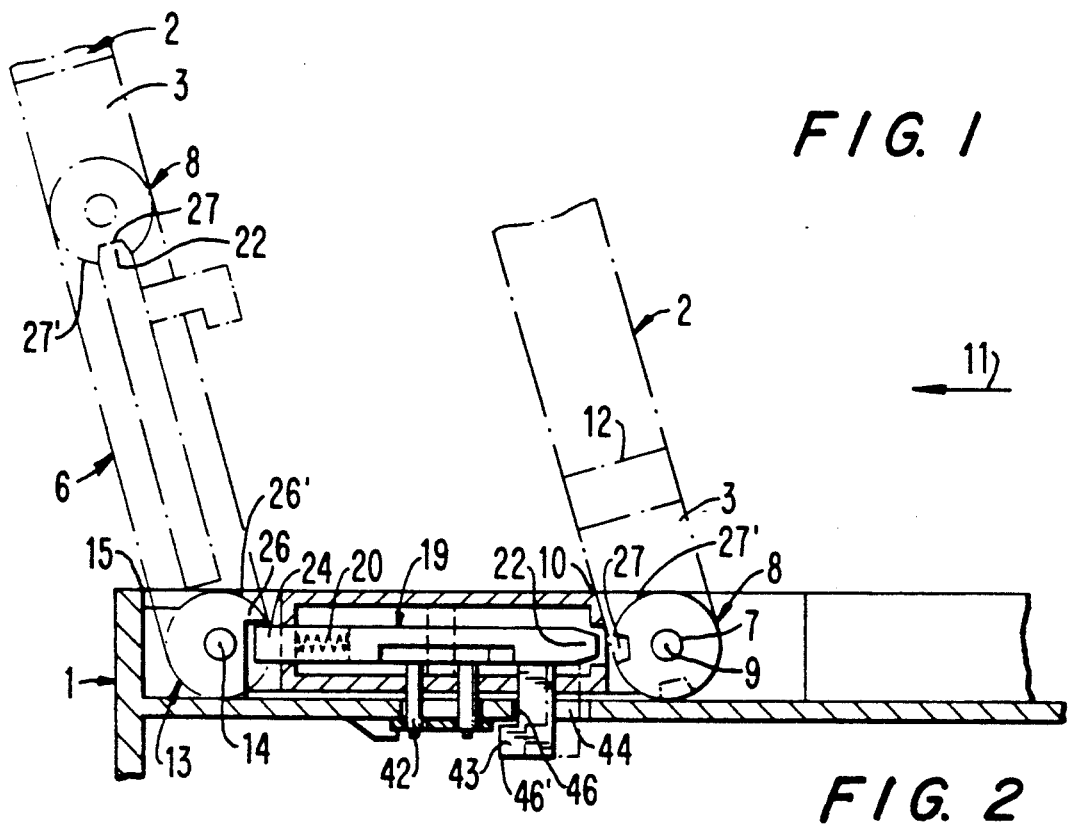
FIG. 1 is a view showing a vertical section of a hinge region on an upper side of the housing through a portable data processing device in accordance with the present invention.

In the drawings a housing 1 of a laptop is shown in a section. A display 2 is arranged turnably on the upper side of the housing and shown in broken lines. The display 2 has a holding arm 3 provided on each side and arranged in a bearing portion 4. The bearing portion 4 is overlapped by a plate portion 5 of a holding arm-extension part 6. A hinge pin 7 extends through both portions 4 and 5 and thereby a first hinge 8 is formed at each side.

The hinge 8 defines a first turning axis 9 which is shown in a dash-dot line at the right side of FIG. 1. It provides for turning up of the display 2 from a transporting position which is parallel to the upper side of the housing 1 to a working position. A surface 10 of the holding arm-extension part 6 serves as an abutment. The turning axis 9 is located forwardly as seen from the user (the observation direction is identified with the arrow 11). A lower edge of the display 2 lies tightly on the upper surface of the housing 1.

For many applications it is desirable that a free space remains underneath the display 2, to allow observation of the region which is located behind the data processing device in direction of the arrow 11. In other words, it provides the observation of the printing region of a printer arranged behind the data processing device.

For enabling this, the holding arm 3 of the display 2 with a holding arm-extension part 6, as can be seen hereinbelow is formed rigid and turnable about a turning hinge 13 which defines a turning axis 14. The turning axis 14 is arranged in the region of the rear edge 15 of the housing away from the user, and in the region of the rear edge 15 is formed as an abutment for the upwardly turned holding arm-extension part 6 as can be seen at the left side in FIG. 1. The hinge 13 is formed by a hinge pin 14' and overlapping hinge lamellas 16 of the holding arm-extension part 6 and 16 of holding part 18 on the housing.

For arresting, the holding arm-extension part 6 and respective not active hinges 8 or 13, a longitudinally displaceable blocking slider 19 is provided. It is biased by a pressure spring 20 formed as a helical spring. The helical spring is supported against a transverse wall 21 of the holding arm extension part 6.

At the end which faces the user, the blocking slider 19 has an arresting portion 22 and a rearward blocking portion 24 at a U-shaped rear edge which embraces the spring 20. In the folded, arrested position, the blocking slider 24 (its end surface) is located in a housing-side recess 25 or under a projection 26 of a radial blocking curve 26' of the lamellas 17 of the holding part 18 on the housing 1. A hook projection 43 is provided on the blocking slider 19 and extends in a housing-side recess 44. In arrested condition of the blocking slider 19 it engages a housing wall 46 so that the holding arm-extension parts 6 are locked relative to the housing 1.

To the contrary, the hinge 8 is free and the display 2 can be turned up to any required position to be used.

When the blocking slider 19, as will be described hereinbelow, is released and displaced to the right in the drawings, the blocking portion 24 disengages while to the contrary the arresting portion 22 engages in an arresting recess 27 on the free lower end of the holding arm 3. Thereby each holding are 3 is rigidly connected with the associated holding arm-extension part 6 and together with it can be turned upwardly about a rear turning axis 14 which is shown at the left side in FIG. 1.

In the arrested condition when the holding arm-extension part 6 is arrested, the display 2 is slightly lifted, an end surface 46' of the hook projection 43 can pass the end surface of the housing wall 46, and a displacement of the blocking slider 19 in the direction of the turning axis 14 is prevented. The turning region is secured by the end surfaces 46' and 46 so that it is so large that at the other end the end surface of the blocking slider 24 lies over the projection 26 before the radial blocking curve 26'. When the display is further lifted and the end surface 46' leaves the region of the end surface 46 of the housing wall, the blocking slider 19 can move in direction of the turning axis 14 since the blocking curve 46' prevents this movement over the whole turning region to the working position with the raised display. Thereby a faulty operation in the turning region of the display or in other words separation of the holding arm 3 from the holding arm-extension part 6 is prevented in a form-locking manner and is possible only in the basic position.

Figure 2:
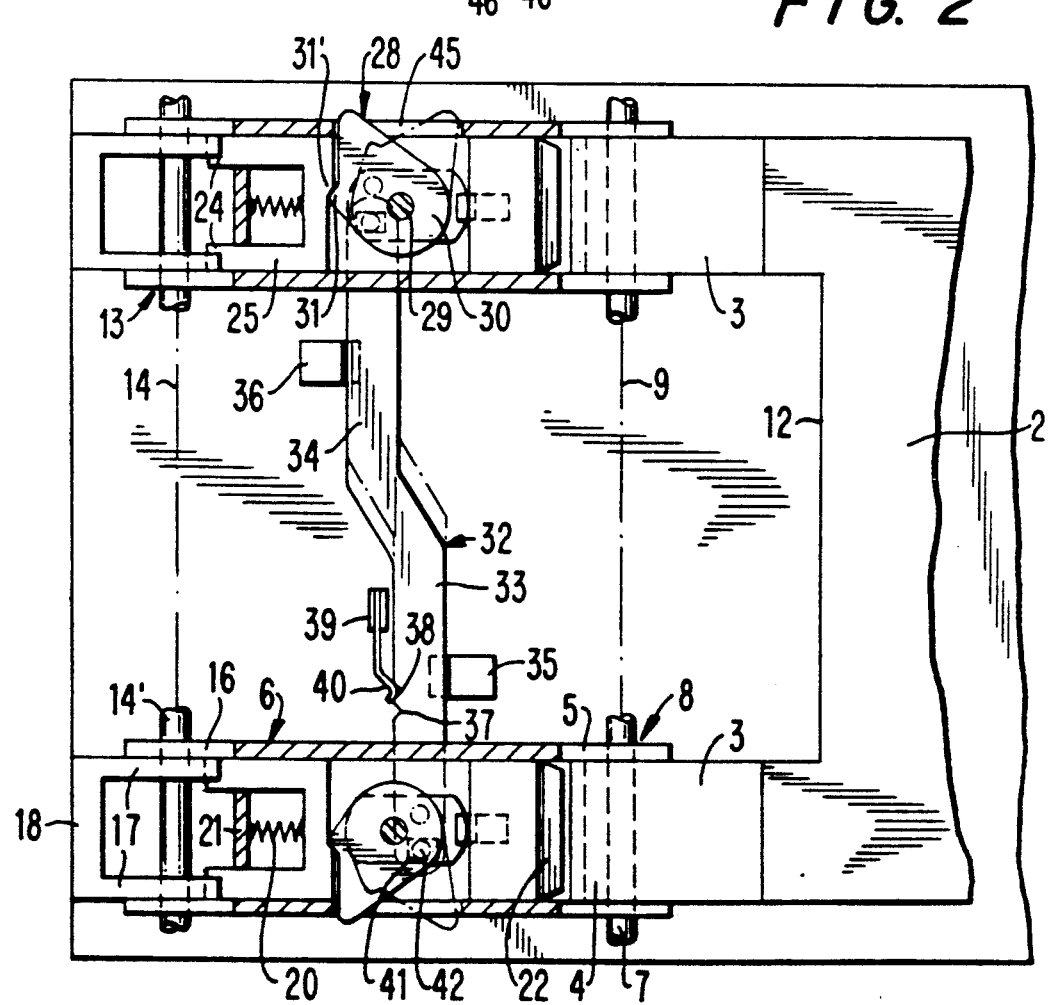
FIG. 2 is a horizontal section of the two-sided hinge of the inventive device.

The actuation of the two-sided blocking slider 19 is performed through a turning lever 28 which projects laterally and is turnable about a stationary pin 29 of the holding arm-extension 6. The turning lever 28 embraces a cam disc 30 having an arresting projection 31. The arresting projection 31 cooperates with a corresponding arresting projection 31' of the blocking slider 19 and fixes the turning lever in the arresting position shown in solid lines in FIG. 2. By turning of the turning lever 28 about the pin 29 to the user or in other words against the direction of the arrow 11 in FIG. 1, the arresting is released and the blocking slider 19 is moved under the action of the pressure spring 20 to the right in the drawings to the released position for the hinge 13.

Due to the arrangement of the arresting portion 22 and the blocking portion 24 of the blocking slider 19 so that one portion leaves the corresponding recess when the other portion is located in the corresponding recess, it is ensured that each hinge arrangement cannot assume a condition which is indefinite for it. In other words, always only one turning axis 9 or 14 is released and the respective parts which are not turnable relative to one another are reliably arrested with one another.

On the other hand, in the basic position or in the turning region of the display 2, due to the front hinge 8 every time independently of one another or simultaneously, the turning lever 21 can be turned to the unlocking position. This is deliberately made difficult by the arresting projection 31' on the blocking slider 19, so that it must be moved first against the pressure spring 20 and then the pressure force can follow. Thereby a continuous safety against faulty operation is provided.

When the switching lever 28 is brought in the turning region of the display 2 over the front hinge 8 to the unlocking position, the blocking slider 19 cannot follow since it abuts with the end surface against the radial blocking curve 27' of the holding arm 3. When the display 2 is brought to the horizontal position, or in other words, to the basic position, the blocking slider 19 can be arrested in the arresting recess 27 and the holding arm-extension part 6 can be released. Therefore at the one side, the display 2 turns subsequently over a front and a rear hinge and this results in a diagonal movement of the display 2 with high transverse forces. In order to exclude the possibilities and to provide an additional safety against one-sided actuation of the turning lever 28, the following construction is provided.

In the direction transverse to the housing 1 or the display 2 and therefore parallel to the lower edge 12 of the display 2, a guiding rod 32 is extended. It has two opposite portions 33 and 34 which are offset in the axial direction and guided in guides 35 and 36 respectively. The portion 33 has two arresting grooves 37 and 38. A spring-biased arresting projection 40 which is stationarily supported at the point 39 can engage in the arresting grooves 37 and 38 so as to provide two definite end positions which correspond to the arresting grooves 37 and 38.

The free ends of the portions 33 and 34 of the guiding rod 32 have a recess 41. A pin 42 of the cam disc 30 engages in the recess 41 in the lowered position of the holding arm-extension part 6 in which it is in alignment with the housing. The recess 41 is preferably greater than the diameter of the pin 42 to compensate for tolerances occurring between the housing and the turning parts.

Due to this arrangement, a form-locking operational connection of the turning lever 28 which permits only an actuating direction and therefore identical operational conditions at both sides are provided. Furthermore, due to this arrangement an actuation from the left to the right or for example at both sides simultaneously is possible. Due to the guiding rod 32, the arresting projection 31 and 31' can be dispensed with.

The actuation of the turning lever 28 can be performed so that it passes in a lateral recess 45 in the holding arm-extension part 6 and correspondingly can be conveniently grasped on the one hand, and on the other hand is not damaged.

It will be understood that each of the elements described above, or two or more together, may also find a useful application in other types of constructions differing from the types described above.

While the invention has been illustrated and described as embodied in a portable data processing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A portable data processing device, comprising a housing having an upper side; a display; turnable holding arms arranged to hold said display above said upper side of said housing, each of said holding arms having a holding arm-extension part provided with a blocking slider, said housing and said holding arm having locking recesses, said blocking slider being movable between two end positions and having a first blocking portion which in one of said end positions engages in said locking recess of said holding arm and a second locking portion which in another of said end positions engages in said locking recess of said housing, said blocking slider being spring biased in direction toward said locking opening of said holding arm and fixed in a locking position which is opposite to a spring force; and a turning arm which locks said blocking slider in said locking position.

2. A portable data processing device as defined in claim 1, wherein said turning arm is formed as a cam disc provided with an arresting projection, said blocking slider having a corresponding arresting projection behind which said arresting projection of said cam disc is arrestable.

3. A portable data processing device as defined in claim 2, wherein said holding arm-extension part has a lateral recess, said turning lever extending through said lateral recess of said holding arm-extension part.

4. A portable data processing device as defined in claim 1, wherein said blocking slider has a lower side provided with a hook projection, said housing having an upper side provided with a recess so that said hook projection extends through said recess of said housing and engages said blocking slider in an arrested condition.

5. A portable data processing device as defined in claim 1, wherein said holding arm-extension part has a transverse wall, said blocking slider having a rear side; and further comprising a helical spring which spring biases said blocking slider and abuts against said transverse wall of said holding arm-extension part and said rear side of said blocking slider.

6. A portable data processing device as defined in claim 1; and further comprising a guiding rod which is transversely displaceable on said housing and provided with recesses, said turning lever being formed as a cam disc having pins which in a turned-in condition of said holding arm extension part extends in said recesses.

7. A portable data processing device as defined in claim 6, wherein said pins of said cam discs are arranged concentrically relative to a turning axis of said cam disc and offset perpendicularly to an axial longitudinal direction of said guiding rod.

8. A portable data processing device as defined in claim 7, wherein said guiding rod has portions which are offset relative to one another in correspondence with said offset of said pins of said cam disc.

9. A portable data processing device as defined in claim 6; and further comprising guides which guide said guiding rod transverse and parallel to a lower edge of said display.

10. A portable data processing device as defined in claim 6, wherein said guiding rod has arresting recesses; and further comprising a springy arresting projection engageable in said arresting recesses so as to arrest said guiding rod in two end positions.

* * * * *